United States Patent
Kim et al.

(10) Patent No.: US 10,676,055 B2
(45) Date of Patent: Jun. 9, 2020

(54) SYSTEM FOR ENERGY ABSORPTION AND LOAD TRANSFER

(71) Applicant: GM GLOBAL TECHNOLOGY OPERATIONS LLC, Detroit, MI (US)

(72) Inventors: Jungryoung Kim, Rochester Hills, MI (US); Shreeganesh Sudhindra, New Hudson, MI (US); Gheorghe Barbuta, Sterling Heights, MI (US); Len V. Peschansky, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/145,338

(22) Filed: Sep. 28, 2018

(65) Prior Publication Data
US 2020/0101915 A1    Apr. 2, 2020

(51) Int. Cl.
*B60R 19/42* (2006.01)
*B60R 19/18* (2006.01)
*B62D 21/15* (2006.01)

(52) U.S. Cl.
CPC .............. *B60R 19/42* (2013.01); *B60R 19/18* (2013.01); *B62D 21/157* (2013.01); *B60R 2019/1826* (2013.01)

(58) Field of Classification Search
CPC ...... B62D 21/157; B62D 21/15; B60R 19/18; B60R 19/42; B60R 2019/186; B60R 2019/1826
USPC ............. 296/187.12; 293/128; 188/371, 372, 188/376, 377
See application file for complete search history.

(56) References Cited

U.S. PATENT DOCUMENTS

| | | | | |
|---|---|---|---|---|
| 5,435,619 A * | 7/1995 | Nakae | .............. | B60J 5/0441 296/187.12 |
| 6,244,638 B1 * | 6/2001 | Kuczynski | .............. | B60R 19/18 188/377 |
| 6,679,967 B1 * | 1/2004 | Carroll, III | .......... | B60N 2/4249 156/222 |
| 6,752,450 B2 * | 6/2004 | Carroll, III | ............... | B32B 3/28 188/371 |
| 8,042,847 B2 * | 10/2011 | Garg | ....................... | B60R 19/12 293/102 |
| 8,226,154 B2 * | 7/2012 | Nakano | .................. | B60J 5/0429 296/146.6 |
| 8,474,903 B2 * | 7/2013 | Palesano | ............... | B62D 25/04 296/193.06 |
| 10,202,091 B2 * | 2/2019 | Steinebach | ............. | B60R 19/03 |

(Continued)

FOREIGN PATENT DOCUMENTS

| JP | 6120460 | * | 4/2017 | ............. B60R 19/18 |
|---|---|---|---|---|
| JP | 6120460 B2 | * | 4/2017 | ............. B29C 43/20 |

*Primary Examiner* — Dennis H Pedder
(74) *Attorney, Agent, or Firm* — Quinn IP Law

(57) ABSTRACT

An exemplary side impact system for a vehicle includes an energy absorption member including a first portion, a second portion, a third portion, and a fourth portion, the first and second portions connected by a first arcuate portion, the second and third portions connected by a second arcuate portion, and the third and fourth portions connected by a third arcuate portion such that the energy absorption member has a W-shaped cross-section and a load path distribution member. The load path distribution member is coupled to the energy absorption member at the first and third arcuate portions.

17 Claims, 1 Drawing Sheet

(56) References Cited

U.S. PATENT DOCUMENTS

| | | | |
|---|---|---|---|
| 10,239,388 B2* | 3/2019 | Clausen | B60J 5/0444 |
| 10,293,771 B2* | 5/2019 | Steinebach | B60R 19/18 |
| 10,407,011 B2* | 9/2019 | Steinebach | B60R 19/023 |
| 2002/0106483 A1* | 8/2002 | Obeshaw | B21C 37/15 |
| | | | 428/116 |
| 2005/0121926 A1* | 6/2005 | Montanvert | B62D 21/157 |
| | | | 293/128 |
| 2007/0187959 A1* | 8/2007 | Adachi | B60R 19/18 |
| | | | 293/120 |
| 2009/0160203 A1* | 6/2009 | Garg | B60R 19/12 |
| | | | 293/120 |
| 2015/0197214 A1* | 7/2015 | Marur | B60N 2/42709 |
| | | | 188/377 |
| 2017/0136970 A1* | 5/2017 | Steinebach | B60R 19/18 |
| 2017/0210211 A1* | 7/2017 | Clausen | B60J 5/0444 |

* cited by examiner

SYSTEM FOR ENERGY ABSORPTION AND LOAD TRANSFER

The present invention relates generally to the field of vehicles and, more specifically, to vehicle structures and, more particularly, to means for enhancing the side impact performance of a vehicle.

Vehicle manufacturers use a variety of structures and components to protect a vehicle's occupants and vehicle components during a side impact collision. Typically, these approaches provide only limited protection while significantly increasing vehicle weight Accordingly, what is needed is a system that provides superior protection for components such as batteries from side impact collisions, while adding minimal weight from impact resistant dedicated structures.

SUMMARY

Embodiments according to the present disclosure provide a number of advantages. For example, embodiments according to the present disclosure reduce passenger-compartment intrusion and damage to chassis-mounted components such as vehicle batteries due to side impact collisions.

In one aspect, a side impact system for a vehicle includes an energy absorption member including a first portion, a second portion, a third portion, and a fourth portion, the first and second portions connected by a first arcuate portion, the second and third portions connected by a second arcuate portion, and the third and fourth portions connected by a third arcuate portion such that the energy absorption member has a W-shaped cross-section; and a load path distribution member. The load path distribution member is coupled to the energy absorption member at the first and third arcuate portions.

In some aspects, the load path distribution member is a rectangular plate with a plate width and a plate length and having an outer surface and an inner surface parallel to the outer surface, the inner surface separated from the outer surface by the plate width.

In some aspects, the plate width is smaller than the plate length.

In some aspects, the first, second, third, and fourth portions of the energy absorption member are continuous such that the energy absorption member is an integral member.

In some aspects, the first and second portions of the energy absorption member define a first space and the third and fourth portions of the energy absorption member define a second space.

In some aspects, the load path distribution member is coupled to the energy absorption member via one or more spot welds.

In some aspects, the load path distribution member is coupled to the energy absorption member via one or more mechanical fasteners.

In another aspect, an automotive vehicle includes a frame member, a vehicle component coupled to the frame member, a side impact system coupled to the frame member, the side impact system including an energy absorption member and a load path distribution member coupled to the energy absorption member, the energy absorption member including a first portion, a second portion, a third portion, and a fourth portion, the first and second portions connected by a first arcuate portion, the second and third portions connected by a second arcuate portion, and the third and fourth portions connected by a third arcuate portion such that the energy absorption member has a W-shaped cross-section.

In some aspects, the load path distribution member is a rectangular plate with a plate width and a plate length and having an outer surface and an inner surface parallel to the outer surface, the inner surface separated from the outer surface by the plate width.

In some aspects, the plate width is smaller than the plate length.

In some aspects, the first, second, third, and fourth portions of the energy absorption member are continuous such that the energy absorption member is an integral member.

In some aspects, the first and second portions of the energy absorption member define a first space and the third and fourth portions of the energy absorption member define a second space.

In some aspects, the load path distribution member is coupled to the energy absorption member via one or more spot welds.

In some aspects, the load path distribution member is coupled to the energy absorption member via one or more mechanical fasteners.

In yet another aspect, a system for absorbing a side impact load on a vehicle includes at least one energy absorption member including a first portion, a second portion, a third portion, and a fourth portion, the first and second portions connected by a first arcuate portion, the second and third portions connected by a second arcuate portion, and the third and fourth portions connected by a third arcuate portion such that the energy absorption member is a continuous member having a V-shaped cross-section and a load path distribution member having an outer surface and an inner surface such that the load path distribution member has a rectangular cross-section. The inner surface of the load path distribution member is coupled to the energy absorption member at one or more of the first and third arcuate portions.

In some aspects, the load path distribution member is a rectangular plate with a plate width and a plate length and having an outer surface and an inner surface parallel to the outer surface, the inner surface separated from the outer surface by the plate width and the plate width is smaller than the plate length.

In some aspects, the first, second, third, and fourth portions of the energy absorption member are continuous such that the energy absorption member is an integral member.

In some aspects, the first and second portions of the energy absorption member define a first space and the third and fourth portions of the energy absorption member define a second space.

In some aspects, the load path distribution member is coupled to the energy absorption member via one or more spot welds.

In some aspects, the load path distribution member is coupled to the energy absorption member via one or more mechanical fasteners.

BRIEF DESCRIPTION OF THE DRAWINGS

The present disclosure will be described in conjunction with the following figures, wherein like numerals denote like elements.

Figure 1:
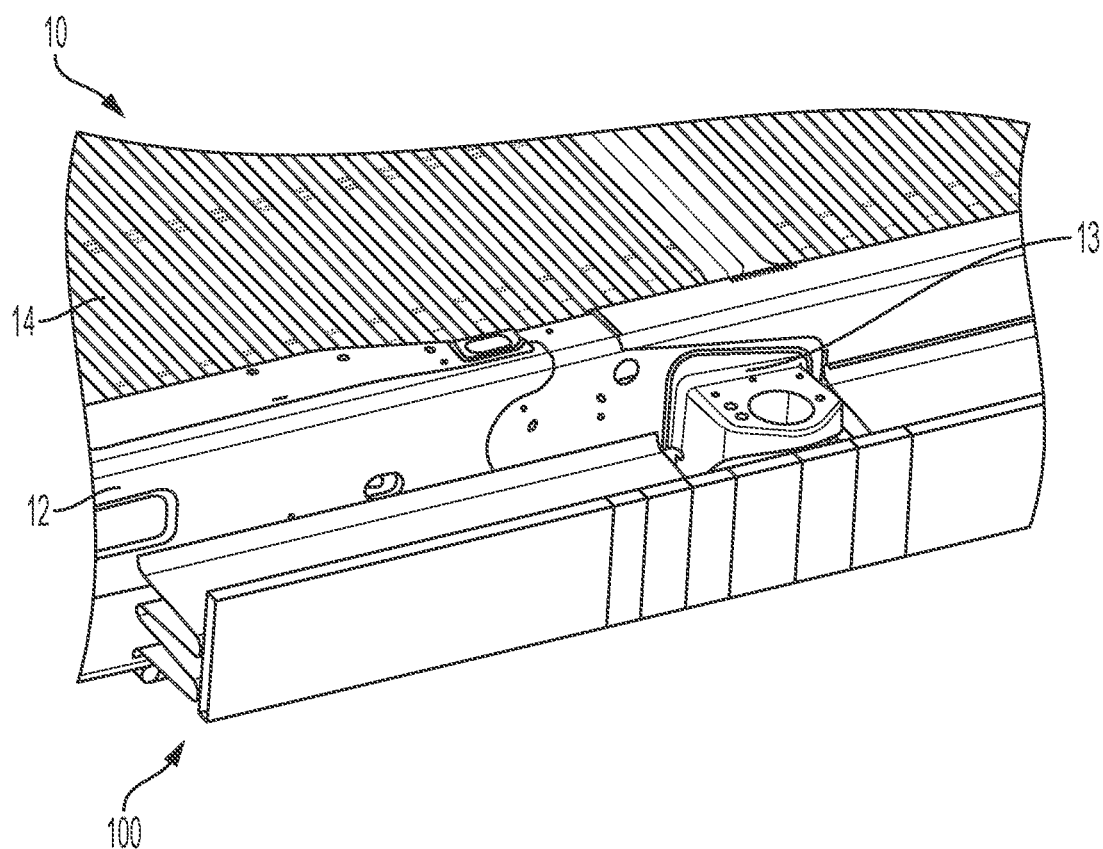
FIG. 1 is a side perspective partial view of a vehicle including a side impact absorption system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

A side impact system, one embodiment of which is described herein, includes an energy absorption member and a load distribution member. In some embodiments, the side impact system is coupled to the vehicle frame of a body-on-frame vehicle having a battery compartment. When coupled together, the side impact system provides protection from passenger compartment intrusion and/or damage to vehicle components such as the electric vehicle batteries.

FIG. 1 illustrates a side impact system 100 for a vehicle 10, according to an embodiment. The side impact system 100 is coupled to a frame member 12 of the vehicle 10 using any type of mechanical means (such as bolts or rivets, for example and without limitation) or chemical means (such as welding, for example and without limitation). In some embodiments, as shown in FIG. 1, an energy absorption member of the side impact system is discontinuous along the length of the vehicle frame member 12 to allow space for other chassis frame members, such as the frame member 13, while a load path management member is continuous and coupled to the one or more discontinuous sections of the energy absorption member, as discussed in greater detail herein.

Figure 2:
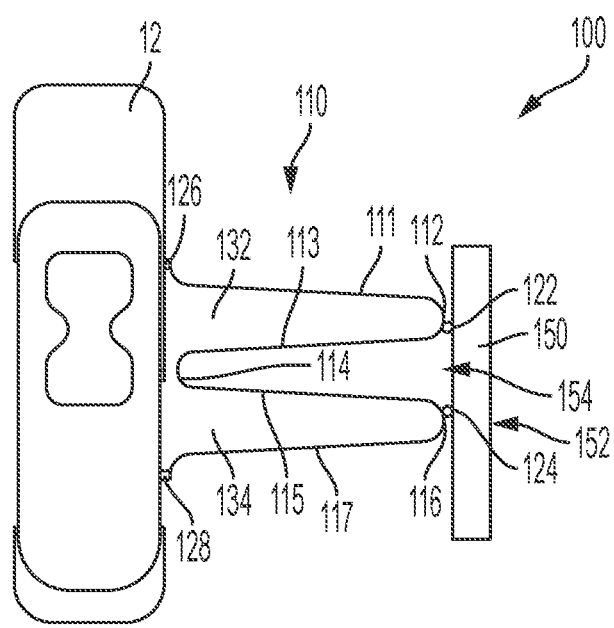
FIG. 2 is a cross-sectional view of the side impact absorption system of FIG. 1, according to an embodiment.

With reference to FIG. 2, the side impact system 100 includes an energy absorption member 110 and a load path distribution member 150. In some embodiments, the energy absorption member 110 includes a first portion 111, a second portion 113, a third portion 115, and a fourth portion 117. The first and second portions 111, 113 are connected by a first arcuate portion 112, the second and third portions 113, 115 are connected by a second arcuate portion 114, and the third and fourth portions 115, 117 are connected by a third arcuate portion 116 such that the energy absorption member 110 has a W-shaped cross-section when viewed with the top of the W-shape oriented towards the vehicle 10. The first and second portions 111, 113 form a first projection and the third and fourth portions 115, 117 for a second projection. Each of the projections extend from the vehicle frame member 12. During a side impact event, in particular a side pole impact, the projections deform to absorb the energy of the event while the load path distribution member 150 distributes the force of the impact along the length of the side impact system 100 to minimize an intrusion into the passenger compartment and/or damage to frame-mounted components such as a battery system for an electric vehicle.

Referring again to FIG. 2, the side impact system 100 also includes a load path distribution member 150. In some embodiments, the load path distribution member 150 is a rectangular plate having a plate width and a plate length. The plate width of the load path distribution member 150 is smaller than the plate length. The load path distribution member 150 has an outer surface 152 and an inner surface 154 parallel to the outer surface 152. The inner surface 154 is separated from the outer surface 152 by the plate width. Preferably, the load path distribution member 150 extends the length of the battery compartment of the vehicle 10, outboard of the vehicle frame member 12, such that the entire length of the battery compartment is protected from a side impact event.

In some embodiments, the energy absorption member 110 is coupled to the load path distribution member 150 at the first and third arcuate portions 112, 116 with spot welds, as indicated at 122 and 124. In some embodiments, the energy absorption member 110 is coupled to the load path distribution member 150 with mechanical fasteners, such as bolts.

In some embodiments, the first, second, third, and fourth portions 111, 113, 115, 117 of the energy absorption member 110 are continuous such that the energy absorption member 110 is an integral member. In other words, in some embodiments, the energy absorption member 110 is formed from a continuous sheet of metal, such as a HR500 or higher-grade steel or aluminum. In some embodiments, the energy absorption member 110 is formed by stamping.

With continued reference to FIG. 2, in some embodiments, the first and second portions 111, 113 of the energy absorption member 110 define a first space 132 and the third and fourth portions 115, 117 of the energy absorption member 110 define a second space 134. Additionally, the radius of the arcuate portion 114 separates the first and second projections of the energy absorption member 110. Along with the hollow spaces 132, 134, the separation defined by the arcuate portion 114 allows the energy absorption member 110 to deform upon impact.

In some embodiments, the energy absorption member 110 is coupled to the frame member 12 by mechanical means (such as bolts or rivets, for example and without limitation). In some embodiments, the energy absorption member 110 is coupled to the frame member 12 by chemical means (such as welding, for example and without limitation). In some embodiments, the energy absorption member 110 is coupled to the frame member at connection points 126, 128. The connection points 126, 128 are located, in some embodiments, at the top and bottom of the energy absorption member 110, as viewed in FIG. 2. However, in other embodiments the energy absorption member 110 may be coupled to the frame member 12 at multiple points along its length and/or width.

As shown in FIG. 1, in some embodiments the energy absorption member 110 is coupled to the frame member 12 along the side of the vehicle 10, but may be discontinuous, that is, one or more separate energy absorption members 110 may be coupled to the frame member 12 along the length of the vehicle 10. Preferably, to provide continuous load path distribution, a single load path distribution member 150 is coupled to the one or more energy absorption members 110 to provide a continuous surface through which the force of the side impact may be distributed to the vehicle frame 12 to minimize the intrusion into the passenger compartment and/or intrusion into the battery compartment of the electric vehicle 10.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about (to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A side impact system for a vehicle having a vehicle length, comprising:
    an energy absorption member comprising a first portion, a second portion, a third portion, and a fourth portion, the first and second portions connected by a first arcuate portion, the second and third portions connected by a second arcuate portion, and the third and fourth portions connected by a third arcuate portion such that the energy absorption member has a wave-shaped cross-section; and a load path distribution member;

wherein the load path distribution member is coupled to the energy absorption member at the first and third arcuate portions and the energy absorption member is discontinuous along the vehicle length and the load path distribution member is continuous along the vehicle length.

2. The side impact system of claim 1, wherein the load path distribution member is a rectangular plate with a plate width and a plate length and having an outer surface and an inner surface parallel to the outer surface, the inner surface separated from the outer surface by the plate width.

3. The side impact system of claim 2, wherein the plate width is smaller than the plate length.

4. The side impact system of claim 1, wherein the first, second, third, and fourth portions of the energy absorption member are continuous such that the energy absorption member is an integral member.

5. The side impact system of claim 1, wherein the first and second portions of the energy absorption member define a first space and the third and fourth portions of the energy absorption member define a second space.

6. The side impact system of claim 1, wherein the load path distribution member is coupled to the energy absorption member via one or more spot welds.

7. An automotive vehicle, comprising:
a longitudinal frame member; and
a side impact system coupled to the frame member, the side impact system comprising an energy absorption member extending longitudinally and parallel to the frame member and a load path distribution member coupled to the energy absorption member and extending longitudinally and parallel to the frame member such that the energy absorption member is between the frame member and the load path distribution member, the energy absorption member comprising a first portion, a second portion, a third portion, and a fourth portion, the first and second portions connected by a first arcuate portion, the second and third portions connected by a second arcuate portion, and the third and fourth portions connected by a third arcuate portion such that the energy absorption member has a wave-shaped cross-section the first and third arcuate portions are vertically spaced;

wherein the energy absorption member is discontinuous along a length of the longitudinal frame member and the load path distribution member is outboard of the longitudinal frame member.

8. The automotive vehicle of claim 7, wherein the load path distribution member is a rectangular plate with a plate width and a plate length and having an outer surface and an inner surface parallel to the outer surface, the inner surface separated from the outer surface by the plate width.

9. The automotive vehicle of claim 8, wherein the plate width is smaller than the plate length.

10. The automotive vehicle of claim 7, wherein the first, second, third, and fourth portions of the energy absorption member are continuous such that the energy absorption member is an integral member.

11. The automotive vehicle of claim 7, wherein the first and second portions of the energy absorption member define a first space and the third and fourth portions of the energy absorption member define a second space.

12. The automotive vehicle of claim 7, wherein the load path distribution member is coupled to the energy absorption member via one or more spot welds.

13. A system for absorbing a side impact load on a vehicle having a longitudinal frame member defining a length of the vehicle, the system comprising:
at least one energy absorption member comprising a first portion, a second portion, a third portion, and a fourth portion, the first and second portions connected by a first arcuate portion, the second and third portions connected by a second arcuate portion, and the third and fourth portions connected by a third arcuate portion such that the energy absorption member is a continuous member having a wave-shaped cross-section; and
a load path distribution member having an outer surface and an inner surface such that the load path distribution member has a rectangular cross-section;
wherein the inner surface of the load path distribution member is coupled to the energy absorption member at one or more of the first and third arcuate portions and the energy absorption member is positioned between the longitudinal frame member and the load path distribution member such that the energy absorption member extends along the length of the vehicle and is discontinuous along the length of the vehicle.

14. The system of claim 13, wherein the load path distribution member is a rectangular plate with a plate width and a plate length and having an outer surface and an inner surface parallel to the outer surface, the inner surface separated from the outer surface by the plate width and the plate width is smaller than the plate length.

15. The system of claim 13, wherein the first, second, third, and fourth portions of the energy absorption member are continuous such that the energy absorption member is an integral member.

16. The system of claim 13, wherein the first and second portions of the energy absorption member define a first space and the third and fourth portions of the energy absorption member define a second space.

17. The system of claim 13, wherein the load path distribution member is coupled to the energy absorption member via one or more spot welds.

* * * * *